US007367472B2

(12) United States Patent
Simson et al.

(10) Patent No.: US 7,367,472 B2
(45) Date of Patent: May 6, 2008

(54) PNEUMATIC VENDING MACHINE

(75) Inventors: Anton K. Simson, Escondido, CA (US); Henri J. A. Charmasson, San Diego, CA (US)

(73) Assignee: Anton K Simson, Escondido, CA (US)

(*) Notice: Subject to any disclaimer, the term of this patent is extended or adjusted under 35 U.S.C. 154(b) by 76 days.

(21) Appl. No.: 11/088,625

(22) Filed: Mar. 24, 2005

(65) Prior Publication Data

US 2005/0247721 A1 Nov. 10, 2005

Related U.S. Application Data

(60) Provisional application No. 60/556,427, filed on Mar. 24, 2004.

(51) Int. Cl.
*B65G 59/00* (2006.01)
*B65H 3/44* (2006.01)
*G07F 11/00* (2006.01)

(52) U.S. Cl. ...................... 221/130; 221/131; 221/226

(58) Field of Classification Search ................ 221/278, 221/124, 198, 197, 224, 251, 258, 279, 287, 221/298, 299, 301, 75, 29, 54, 81, 88, 161, 221/226, 130, 131

See application file for complete search history.

(56) References Cited

U.S. PATENT DOCUMENTS 2,722,745 A * 11/1955 Brenner ...................... 433/161
3,130,865 A * 4/1964 Ono et al. .................. 221/226
3,596,787 A * 8/1971 Rowlands et al. .......... 414/414
3,847,301 A * 11/1974 Shaw ............................ 221/5
4,017,001 A * 4/1977 Barthalon et al. ............ 221/5
4,126,248 A 11/1978 House
4,142,863 A * 3/1979 Covington et al. ........... 422/63
4,997,076 A * 3/1991 Hirschfeld et al. ......... 194/212
5,097,986 A * 3/1992 Domberg et al. ....... 221/150 R
5,105,978 A * 4/1992 Trouteaud et al. ...... 221/150 R
5,261,208 A * 11/1993 Lockhart ..................... 53/398
5,335,816 A * 8/1994 Kaufman et al. ............. 221/13
5,370,265 A * 12/1994 Mackay et al. ............ 221/279
5,542,569 A * 8/1996 Millar ........................ 221/116
5,553,599 A * 9/1996 Benavides ................... 124/73
5,651,476 A 7/1997 Percy et al.
5,706,977 A * 1/1998 Ogura et al. ................ 221/197
6,253,954 B1 * 7/2001 Yasaka ........................ 221/93
6,328,180 B1 * 12/2001 Sorensen et al. ........... 221/131
6,478,187 B2 11/2002 Simson et al.
6,834,775 B1 * 12/2004 Collins ....................... 221/124
2005/0035197 A1 2/2005 Brusso et al.

* cited by examiner

*Primary Examiner*—Gene C. Crawford
*Assistant Examiner*—Rakesh Kumar
(74) *Attorney, Agent, or Firm*—Charmasson, Buchaca & Leach, LLP

(57) ABSTRACT

A machine particularly adapted for dispensing light items packaged in symmetrical, frustum-shaped container. The items are propelled through a tubular cartridge and individually ejected by a flow of air generated by a blower under control of a toggling dual-gate mechanism at the dispensing end of the cartridge. The dual-gate mechanism of a removable magazine grouping a number of cartridges can be selectively addressed and activated by means of a solenoid-driven cross-bar assembly.

13 Claims, 5 Drawing Sheets

PNEUMATIC VENDING MACHINE

PRIOR APPLICATION

This application claims the benefit of U.S. Provisional Utility Patent Application Ser. No. 60/556,427 filed Mar. 24, 2004.

FIELD OF THE INVENTION

This invention relates to machines for dispensing goods including automatic vending machines, and more specifically to machines for dispensing articles or substances packaged in symmetrical containers such as the ones commonly used in connection with individual servings of coffee, tea, sugar, shampoo, toothpaste, as well as medicines and cosmetics.

BACKGROUND

In the coffee service industry, individual doses of coffee, tea or chocolate are often offered in small containers that are configured to be readily inserted in a brewing machine. Boxes holding large quantities of the products are usually placed next to the brewing machines for the convenience of employees and customers. In most cases, this type of beverage service is provided and paid by the employer.

The system is subject to abuses. Unscrupulous employees may grab handfuls of containers for use at home. Unsupervised persons, such as maintenance and janitorial crews who frequent the premises during off hours may also be tempted to help themselves to undue quantities of goods.

There is a need to find a convenient solution to the uncontrolled presentation and dispensing of small packaged articles.

SUMMARY

The instant embodiments provide a simple, inexpensive, and efficient way to store, transport, display and dispense small packaged items under some form of paid or verifiable accounting to authorized or paying customers.

The instant embodiments provide a machine for selectively dispensing one out of a number of items stored in a removable magazine formed by a two dimensional stacking of horizontally aligned tubular cartridges. Each cartridge forms an internal channel whose cross-section is commensurate with the cross-section of the leading and largest portion of the kind of item it contains, such as the lid or brim of a frusto-conical cup. A pressurized fluid, preferably a flow of air generated by a blower or turbine, is applied to the back aperture of the channel in order to propel the items forwardly toward the frontal dispensing aperture where a toggling barrier mechanism can be momentarily activated to let the most forwardly positioned item to escape, while the next item in line and every other item behind it are held back.

In some embodiments, a crossbar actuator is used to selectively drive the barrier mechanism controlling the dispensing of the desired type of item. The dispensing of an item must be enabled either by the dialing of a personal identification code on a keypad, or by payment by way of currency, smartcard or a combination of both.

DESCRIPTION OF THE PREFERRED EMBODIMENTS

Figure 3:
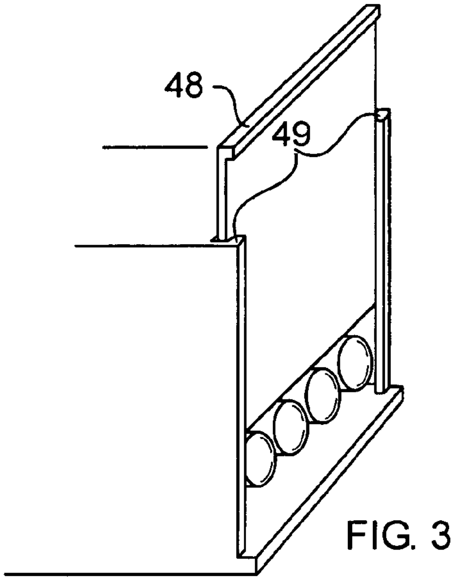
FIG. 3 is a partial rear perspective view.
Figure 1:
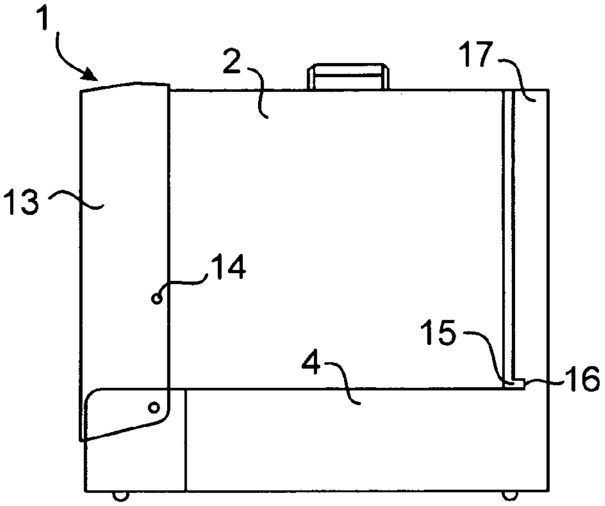
FIG. 1 is a side elevational view of a vending machine according to the invention.

Referring now to the drawing, there is shown a vending machine 1 particularly adapted to dispense a number of different items packaged in light containers made of paper or plastic. In this particular embodiment, the machine is intended to dispense individual servings of coffee or other beverages such as K-CUP brand coffee, tea and chocolate packages commercially available from the Keurig Brewers Company. The machine accommodates a removable magazine 2 that groups a series of cartridges 3 each holding a different type of product. The base 4 of the machine houses electro-mechanical and pneumatic mechanisms that control the dispensing of the goods off the cartridges. An electronic control unit 5 provides an interface with the user of the machine by way of an alpha-numeric readout 6, a smart card reader 7, an alpha-numeric keypad 8, a currency acceptor 9, and a series of control buttons 10. A dispensing pocket 11 for the goods is provided in the frontal portion of the base. The pocket is accessible by pushing a flap door 12. The front of the machine is sealed by a cover 13 whose transparent face permits viewing of the first item in each cartridge. In its closed position, the cover is locked by a couple of solenoid-control bolts 14. The magazine has a flange in its lower back that interlocks with a commensurate groove 16 in the back panel 17. Once the magazine 2 is installed on the machine and the cover has been shut and locked, the magazine cannot be removed.

Figure 8:
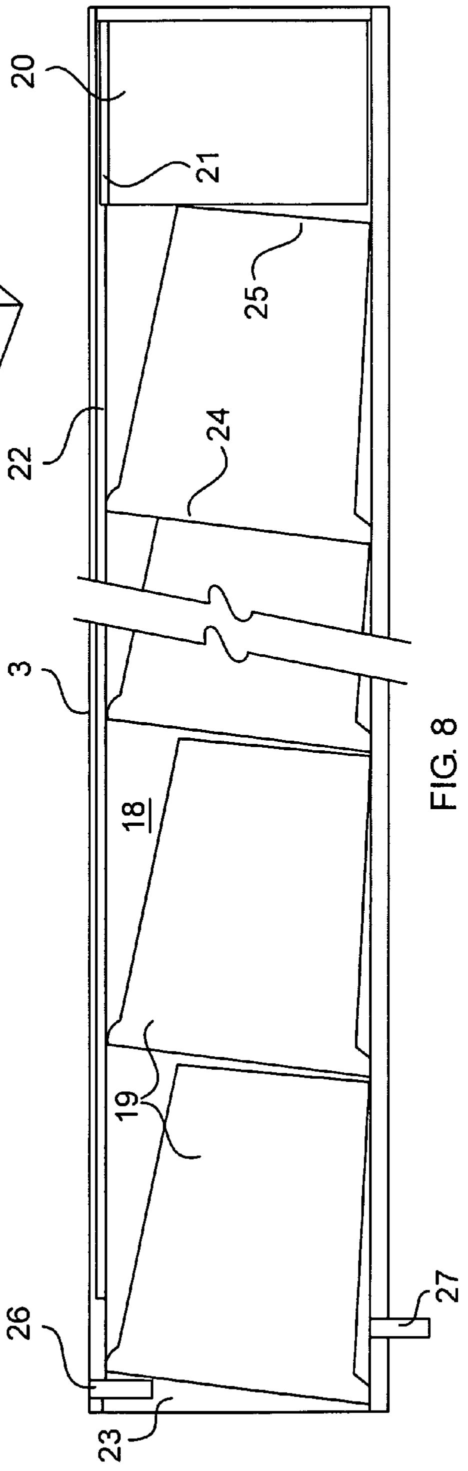
FIG. 8 is a cross-sectional view of a cartridge.
Figure 10:
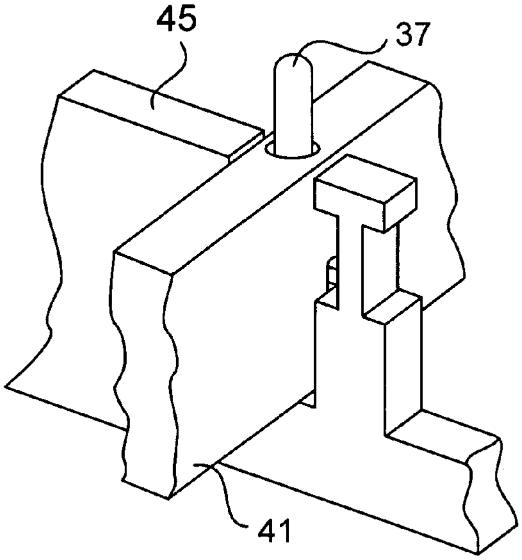
FIGS. 10 and 11 are perspective view of the crossbar engaging structure.

As more particularly illustrated in FIG. 8, each tubular cartridge 3 forms a channel 18 into which the symmetrical items 19 to be dispensed are lined one-behind-the-other followed by a plug 20 acting as a dummy item slidingly engaged in a last position behind all other items into the rear portion of the channel. The plug has a key 21 projecting radially along the length of its upper wall into a groove 22 cut along the roof of the channel 18. The groove terminates short of the front aperture 23 of the channel. Once the key reaches the end of the groove, the plug cannot be ejected out the front aperture of the channel as are the items 19. It should be noted that each item 19 has a leading portion 24 whose cross-section is substantially commensurate with the inside diameter of the channel 18. The geometry of the item then tapers down to a trailing portion 25 of a lesser diameter. Near the front aperture 23 of the channel, a pair of toggling barriers 26, 27 can be alternately inserted between an upper and lower portion of the channel to separately hold or release a single item at-a-time under the push of the plug 20. The plug is propelled forwardly down the channel by an influx of compressed air generated by a motor-driven blower 28 housed in the base 4 of the machine, and continuously distributed to the cartridges through a manifold 29 formed in the back panel 17. This pneumatic driving system is not necessary if the cartridges in the magazine are held in a substantially slanted position wherein the items and the plugs are translated downwardly toward the front aperture under the force of gravity.

Figure 6:
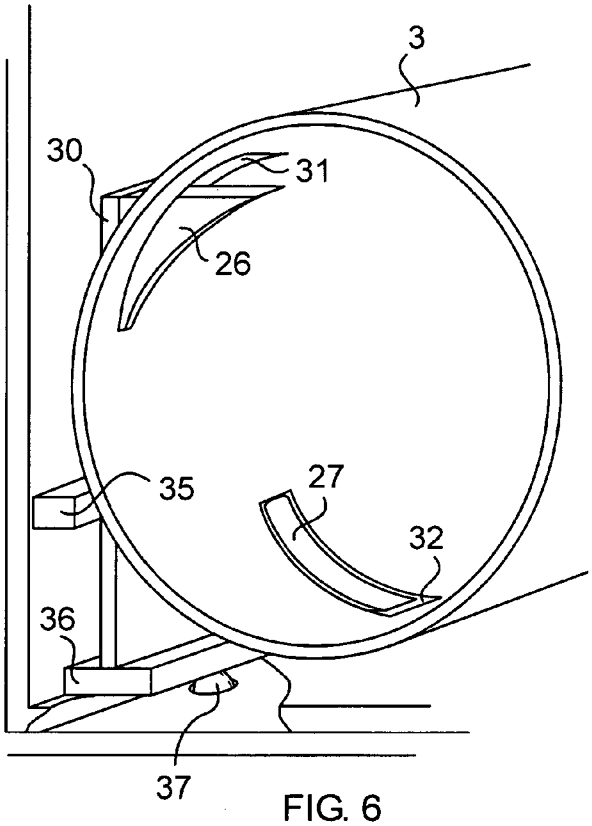
FIG. 6 is a partial perspective view of the toggling barrier mechanism.
Figure 7A:
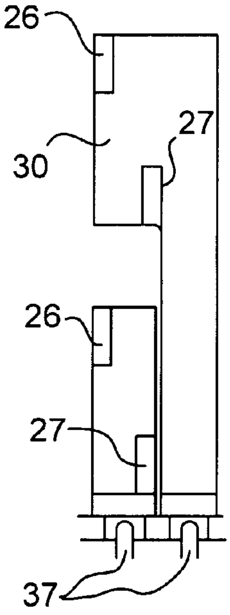
FIGS. 7A and 7B are views of the left and right sides of the toggling plate.
Figure 7B:
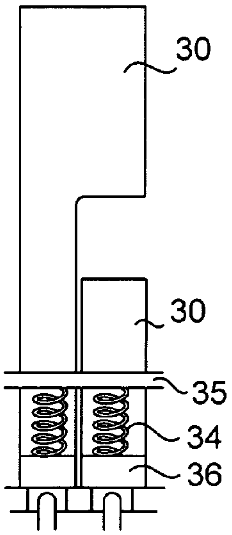
Figure 9:
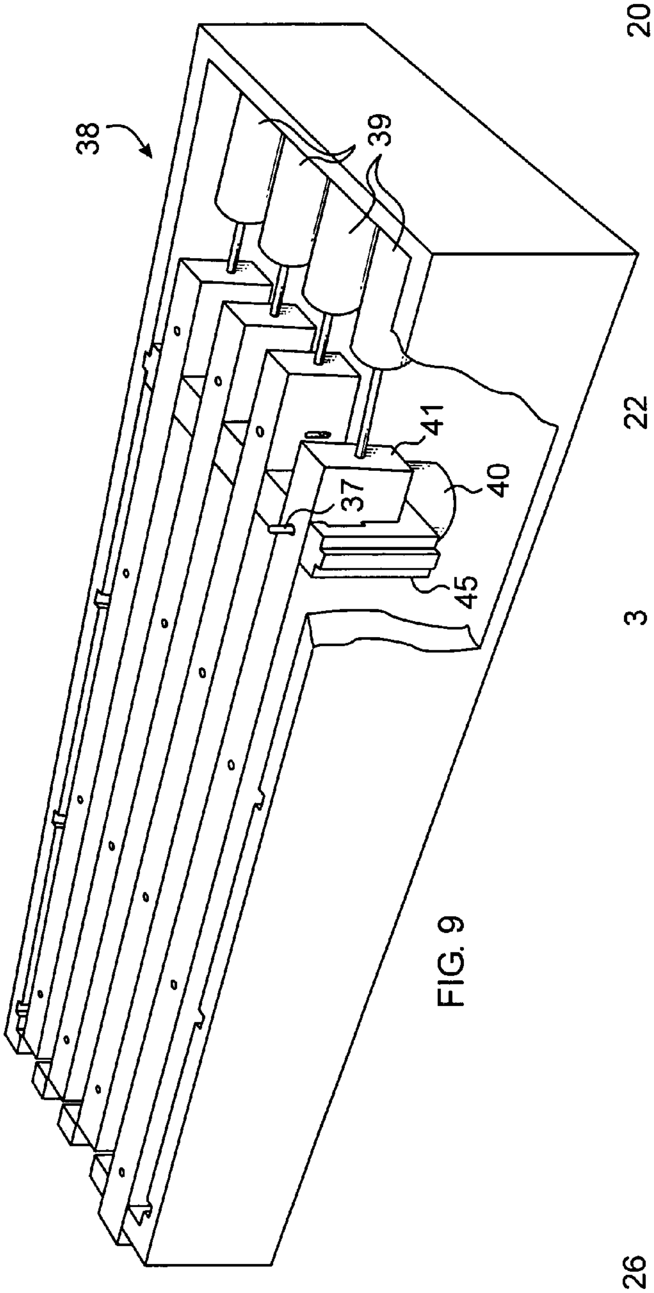
FIG. 9 is a perspective view of the crossbar actuator.

The toggling barrier mechanism is more particularly illustrated in FIGS. 6 and 7. The first and second substantially triangular barriers 26, 27 are mounted on a single push plate 30 associated with each cartridge of which only two superimposed ones are shown in FIGS. 7A and 7B. Each barrier can penetrate into a small arc section of the cartridge channel through a pair of slots 31, 32 arcuately cut into the wall of the cartridge. A number of plates 30 can be laid side-by-side to control the operation of superimposed cartridges as shown in FIG. 7. The plates are allowed to travel up and down within an oblong enclosure 33, wherein when in the down position, the upper barrier 26 is held in the retaining position illustrated in FIG. 6, while the second barrier 27 is held in a clearing position. When the push plate 30 is momentarily moved upwardly, the first barrier is placed in a releasing position clear of the channel, and the second barrier 27 is placed into a retaining position. This momentary movement of the barriers allow the first item in line to be ejected while the item next in line is held back by the second barrier. As the barriers return to their rest position, the next item in line moves down the channel the short distance between the second and first barriers ready for the next dispensing maneuver. Each push plate is urged downwardly by a coil spring 34 compressed between a fixed bar 35 particularly associated with the magazine structure and the flanged foot 36 of the push plate. The push plates are selectively lifted by push pins 37 rising from an actuator assembly 38 in the base of the machine, and passing through bores in the floor of the magazine.

Figure 11:
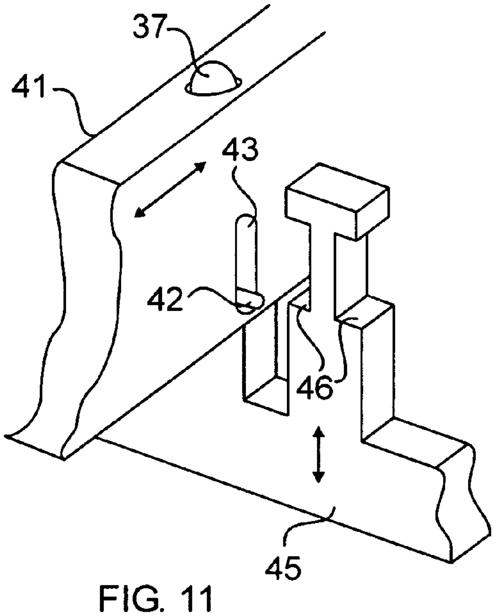
Figure 12:
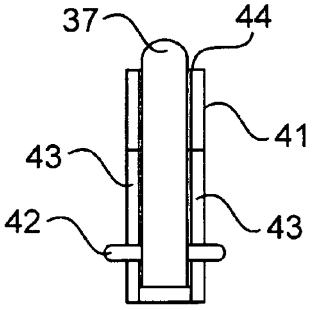
FIG. 12 is a cross-sectional view of a push pin.

As more specifically shown in FIGS. 9-12, the actuator assembly 38 comprises a cross-bar array driven by two sets of solenoids. Each in the first sets of solenoids 39 controls one row of cartridge in the magazine. Each of the second set of solenoids 40 controls one of the columns of cartridges. The selection of a particular row of cartridges is determined by the position of a row bar 41. Each row bar houses a series of push pins 37 which can be displaced upwardly by acting on a transversal pin 42 riding in a pair of slots 43 cut in the row bar through the walls of the well 44 housing the push pin. When the row bar 41 is pushed inwardly by it solenoid, the push pin 37 and its cross-pin 43 line up with a column bar 45. As the column bar is pushed upwardly by its solenoid 40, the transversal pin 42 becomes engaged by a cut 46 in the column bar on either side of the row bar, and, as the column bar is lifted, the push pin 37 is raised to actuate the corresponding toggling barrier in one of the cartridges. If the row bar is not engaged, as illustrated in FIG. 11, the lifting of the column bar misses the transversal pin, and the push pin remains in its well.

In a machine with a small magazine, one solenoid could be advantageously assigned to each toggling plate lieu of the crossbar actuator assembly 38 described in connection with this description of the preferred embodiment of the invention.

While the preferred embodiment has been limited to a four-by-four array of cartridges, it must be understood that much larger magazine can be used with corresponding larger actuator array. The cartridges can be shaped to accommodate a variety of packages not necessarily of a circular geometry.

Figure 2:
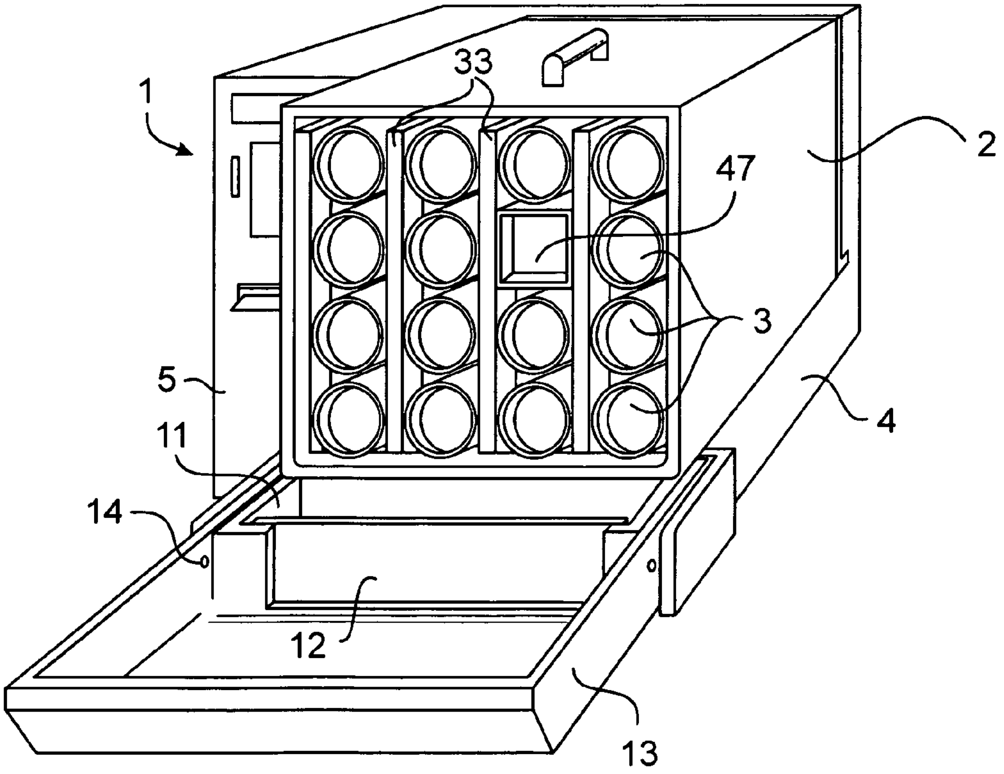
FIG. 2 is a front perspective view thereof with the cover in the open position.
Figure 4:
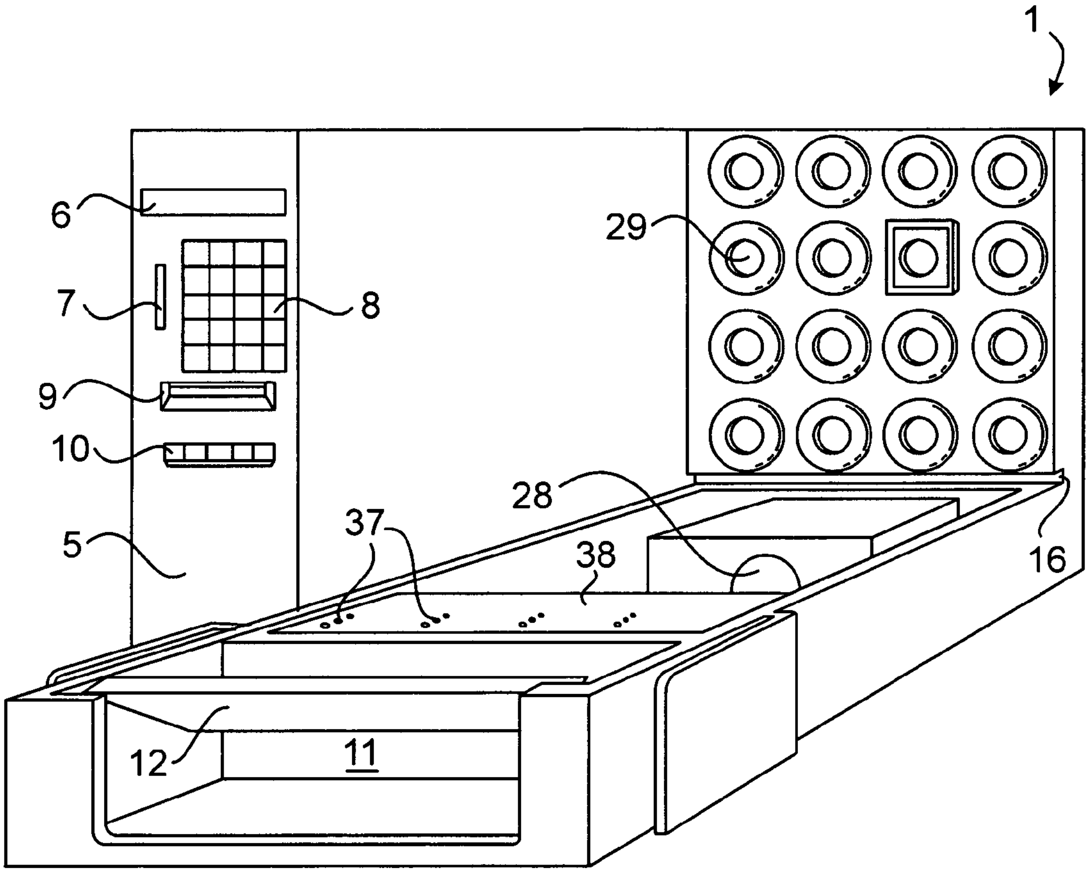
FIG. 4 is a front perspective view of the machine with the magazine and cover removed.
Figure 5:
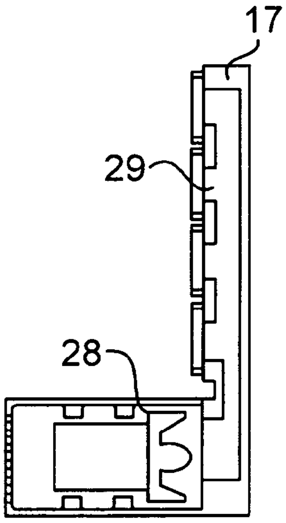
FIG. 5 is a cross-sectional view of the rear portion of the machine.

For instance, the quadrangular cartridge 47 illustrated in FIG. 2 could accommodate cubic or oblong rectangular containers of tooth paste, chewing gum, cookies or candies. The spacing between the first and second barriers may have to be adjusted to accommodate the full length of each item in the case where, for instance, shape of package is not frusto-conical or frusto-pyramidal. Bottles and some types of jars can be easily handled by limiting the spacing between the barriers to the thickness of the cap.

During transport and storage of the magazine, the back can be closed and secured by a backplate 48 riding, guillotine-style, in a pair of grooves 49 in the lateral walls of the magazine.

The electronic control unit is substantially similar to the one disclosed in connection with another type of vending machine in U.S. Pat. No. 6,478,187 Simson et al., which patent is incorporated in this specification by this reference. The operation of the currency acceptor in connection with a smart card, substantially similar to one described in U.S. patent application Ser. No. 10/782,661, U.S. Patent Publication No. 20050035197 incorporated herein by this reference, for a vending machine with electronic payment media.

The electronic control unit allows for selective dispensing of a type of item in one of the cartridge by entry of a personal identification code on the keypad 8, or payment by way of a smartcard through the smartcard reader 7. The smartcard may be recharged by an amount of currency deposited through the currency acceptor 9. Accordingly an employer or operator of the machine can allow free access to the goods by authorized persons by assigning to each one of them a confidential identification code, or by providing the individuals with smartcards pre-charged with a monthly amount of cash credit usable on the machine. Full or partial payment can optionally be required using the combination of the currency acceptor and smartcard.

While the preferred embodiment of the invention has been described, modifications can be made and other embodiments may be devised without departing from the spirit of the invention and the scope of the appended claims.

What is claimed is:

1. A machine, for selectively dispensing a plurality of items, which comprises:

at least one tubular cartridge, said cartridge forming an elongated channel having a frontal dispensing aperture, a back-loading aperture, and a cross-section commensurate with a maximal cross-section of one of said items;

at least one item engaged into said cartridge;

means for generating a continuous flow of pressurized air from said back-loading aperture to said frontal aperture, and for applying said flow of air to said item, propel it toward said frontal aperture, and eject it out of said cartridge; said means comprising a source of pressurized air and conduit means for feeding said pressurized air to said back aperture;

a first barrier movable from a closing position across a first fraction of said frontal aperture to a releasing position clear of said channel;

a second barrier movable from a clearing position clear of said channel to a retaining position across a second fraction of said frontal aperture rearwardly from said first fraction;

said first and second barriers being togglably linked to alternately move said second barrier to said retaining position when said first barrier is moved into said releasing position, and to said clearing position when said first barrier is moved into said closing position; and wherein said flow of air propels said item past each of said barriers in their respective releasing position and ejects it out of said cartridge.

2. The machine of claim 1, which further comprises:

a plurality of said items engaged into said cartridge; and wherein said items have a common given length and said second barrier is spaced-apart from said first barrier by a distance lesser than said length.

3. The machine of claim 2 which further comprises means for moving said first barrier to said releasing position and said second barrier to said holding position during a momentary period of time and for simultaneously applying said pressurized fluid to said back-loading aperture;

whereby one of said items normally held by said first barrier is ejected through said frontal aperture while any other one of said items in said channel is held back by the return of said first barrier to the closing position.

4. The machine of claim 3 in combination with a plurality of symmetrical ones of said items each having a leading portion cross-section shaped and dimensioned to substantially fit the cross-section of said channel, and a trailing portion cross-section of lesser area than said leading portion cross-section.

5. The machine of claim 2 which comprises:

a plurality of said cartridges assembled into a magazine; and wherein said means for moving comprises means for selectively toggling the barrier of one of said cartridges.

6. The machine of claim 2 wherein a plug acting as a dummy item is engaged into said cartridge in a last position behind all other said items.

7. The machine of claim 6 which further comprises means for preventing ejection of said plug from said cartridge regardless of the position of said barriers.

8. The machine of claim 5, wherein said conduit means comprise a manifold, at the back of said magazine, distributing said pressurized air to said plurality of cartridges.

9. The machine of claim 5, wherein said means for toggling comprises an electro-mechanical mechanism including at least one solenoid.

10. A machine, for selectively dispensing a plurality of items, which comprises:

a plurality of cartridges assembled into a magazine, each of said cartridge forming an elongated channel having a frontal dispensing aperture, a back-loading aperture, and a cross-section commensurate with a maximal cross-section of one of said items;

a source of pressurized fluid;

conduit means for feeding said pressurized fluid to said back aperture;

a first barrier movable from a closing position across a first fraction of said frontal aperture to a releasing position clear of said channel;

a second barrier movable from a clearing position clear of said channel to a retaining position across a second fraction of said frontal aperture rearwardly from said first fraction;

said first and second barriers being togglably linked to alternately move said second barrier to said retaining position when said first barrier is moved into said releasing position, and to said clearing position when said first barrier is moved into said closing position;

wherein said items have a common given length and said second barrier is spaced-apart from said first barrier by a distance lesser than said length;

means for selectively toggling the barrier of one of said cartridges; and said means for toggling comprises a cross-bar array.

11. The machine of claim 10, wherein said means for toggling further comprises a set of solenoids driving said array.

12. A machine, for selectively dispensing a plurality of items, which comprises:

at least one tubular cartridge, said cartridge forming an elongated channel having a frontal dispensing aperture, a back-loading aperture, and a cross-section commensurate with a maximal cross-section of one of said items;

at least one item engaged into said cartridge;

means for generating a flow of air from said back-loading aperture to said frontal aperture, and for applying said flow of air to said item and propel it toward said frontal aperture; said means comprising a source of pressurized air and conduit means for feeding said pressurized air to said back aperture;

a first barrier movable from a closing position across a first fraction of said frontal aperture to a releasing position clear of said channel;

a second barrier movable from a clearing position clear of said channel to a retaining position across a second fraction of said frontal aperture rearwardly from said first fraction;

said first and second barriers being togglably linked to alternately move said second barrier to said retaining position when said first barrier is moved into said releasing position, and to said clearing position when said first barrier is moved into said closing position;

a plurality of said items engaged into said cartridge;

wherein said items have a common given length and said second barrier is spaced-apart from said first barrier by a distance lesser than said length;

a plurality of said cartridges assembled into a magazine;

wherein said means for moving comprises means for selectively toggling the barrier of one of said cartridges; and wherein said magazine is detachable from said machine.

13. A machine, for selectively dispensing a plurality of items, which comprises:

a plurality of cartridges assembled into a magazine, each of said cartridge forming an elongated channel having a frontal dispensing aperture, a back-loading aperture, and a cross-section commensurate with a maximal cross-section of one of said items;

a source of pressurized fluid;

conduit means for feeding said pressurized fluid to said back aperture;

a first barrier movable from a closing position across a first fraction of said frontal aperture to a releasing position clear of said channel;

a second barrier movable from a clearing position clear of said channel to a retaining position across a second fraction of said frontal aperture rearwardly from said first fraction;

said first and second barriers being togglably linked to alternately move said second barrier to said retaining position when said first barrier is moved into said releasing position, and to said clearing position when said first barrier is moved into said closing position;

wherein said items have a common given length and said second barrier is spaced-apart from said first barrier by a distance lesser than said length;

means for selectively toggling the barrier of one of said cartridges; and wherein said magazine is detachable from said machine.

* * * * *